March 5, 1957 — N. N. STRAATVEIT — 2,783,714
ROTARY MACHINE
Filed Jan. 2, 1952 — 2 Sheets-Sheet 1

Inventor
Nils Nilsen Straatveit
By:
Shenderoth, Lind & Ponack
Attorneys.

Inventor
Nils Nilsen Straatveit
By:
Thenderoth, Lind & Ponack
Attorneys.

United States Patent Office 2,783,714
Patented Mar. 5, 1957

2,783,714

ROTARY MACHINE

Nils Nilsen Straatveit, Oslo, Norway

Application January 2, 1952, Serial No. 264,439

Claims priority, application Norway January 12, 1951

6 Claims. (Cl. 103—131)

This invention relates to rotary machines having a piston driving or driven by gaseous or liquid mediae and in which the piston performs such movement that every point thereof moves on circles which all has like or substantially like radii. In such machines the piston may be annular with an axial slot therein and move within an annular working space.

In most cases it will be practical to construct the arcuate surfaces of the working space and of the piston of such machines in the shape of cylindrical surfaces. However, nothing prevents obtaining the valuable results of the invention also by the use of other shapes.

The transfer of the driving force between the driving shaft and the piston and the transfer of forces to the piston for control of the movement of the latter, may take place in different ways.

An object of the present invention is to provide a rotary machine of the type referred to, in which the transfer of forces to or from the piston takes place by means of organs which are rigidly connected to the piston and where the necessary movement of said organs is made possible by the provision, in the walls of the working space, of openings larger than those which are, at every moment, filled by the force transferring organs.

The invention provides simple means serving to eliminate or materially eliminate leakage of working medium through said openings in the walls of the working chamber.

The invention relates to rotary machines of the type referred to comprising a housing having exterior wall and interior wall, a piston provided between said walls and so supported and controlled that during operation all points of the piston are moving on circles of like or substantially like radii, the piston being rigidly connected to organs adapted to transfer forces to or from the piston, said transfer organs being freely movable in an opening in a wall of the working space, which opening is at every moment of the operation not filled up by said force transfer organs and the essential novelty of the invention resides in the provision of tightening or sealing organs which for each revolution of the machine shaft perform a certain relative movement within said openings which tightening organs are so constructed and arranged that during the movement of the force transfer organs within said openings the tightening organs always limit or entirely close off the free space between the force transfer organs and the surfaces defining of said openings, whereby leakage of the working medium is reduced or prevented.

The invention also comprises other features which will become evident from the following detailed description in connection with the drawings which by way of example illustrate a number of preferred embodiments.

On the drawings:

Figs. 1 and 2 diagrammatically show vertical sections through a rotary machine of the type in question. Fig. 1 is a section taken along line I—I of Fig. 2, and Fig. 2 is a section taken along line II—II of Fig. 1.

Fig. 3 shows a section taken along line III—III of Fig. 4, and Fig. 4 shows a section taken along line IV—IV of Fig. 3.

Figure 1:
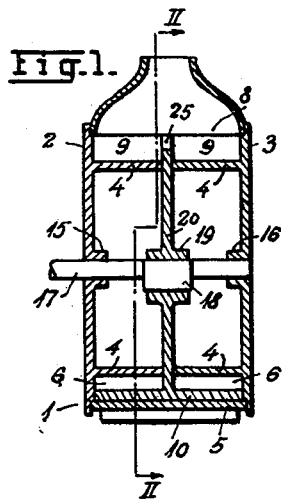

Referring to Fig. 1 the housing 1 comprises two end walls 2 and 3 respectively, and two concentrically arranged cylindrical walls 4 and 5 respectively. Between said cylindrical walls an angular working space 6 is formed. The inlet opening 7 and the outlet opening 8 for the working medium are provided in the outer cylindrical wall. Between the inlet and the outlet openings 7 and 8 respectively is provided a radially extending partition 9 separating the low pressure side of the machine from the high pressure side thereof. The piston 10 is annular and is excentrically arranged within the working space 6. The piston is provided with an axially extending slot therein, at the location of the partition 9.

The driving shaft 17 is rotatably mounted in the housing by means of bearings 15 and 16. The driving shaft is provided with an eccentric 18 surrounded by a bearing 19. For transfer of driving force between the piston 10 and the driving shaft 17 a radially extending disc 20 is provided centrally on the piston. Said disc 20 is rigidly connected to the bearing 19 and to the piston 10 respectively.

Organs controlling the piston in such manner the same performs the movement above referred to in which all points of the piston move in circles which all have like or substantially like radii, may be of different types. Such organs are not illustrated on the drawings being unnecessary for understanding the invention.

In order that the force transfer organ (disc 20) shall be able to move freely during operation of the machine and not become hindered in its movements by the partition 9, the partition 9 is provided with an opening 25. Since this opening is covered entirely by the force transfer organ (disc 20) only when the piston is in its top position, leakage may occur through a more or less part of said opening for all other positions of the piston, and the object of the invention is to decrease or eliminate such leakage.

Figure 2:
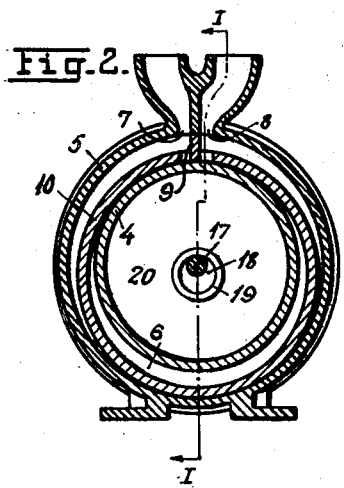
Figure 3:
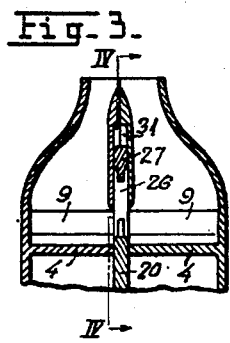
Figs. 3, 4, 5, 6, 7 and 8 illustrate different arrangements of tightening organs according to the invention.
Figure 4:
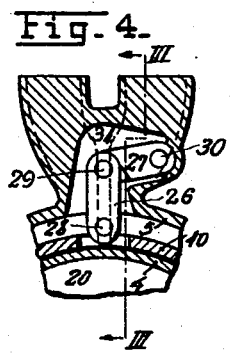

Figures 3 and 4 illustrate an embodiment of means for this purpose. These figures show part of a rotary machine, corresponding to that of Figs. 1 and 2, provided with means for reducing the leakage. Said means here consist of a linkage, comprising links 26 and 27. Link 26 is connected to the disc 20 by means of a stud 28 and may pivot on said stud in relation to the disc 20. The links 26 and 27 are interengaged by means of a pivot 29. Link 27 is pivoted on the housing by means of a pivot stud 30. The link 26 covers that part of the opening in the partition 9 which is not, in each moment, filled by the force transfer organ (disc 20). The link 26 extends further through an opening provided in the outer wall 5 of the working space and into an externally closed chamber 31. The link 27 is so situated within said chamber 31 that one end of the link makes a tight slidable fit with the interior wall face of the chamber 31. The link 26 is bifurcated at its ends where it embraces and is pivotally connected to the disc 20 and to an end of link 27 respectively.

The linkage may also be constructed in a number of other manners than shown in Figs. 3 and 4.

Figure 5:
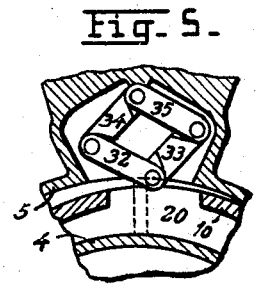

The linkage may also be composed of parts or systems which oscillate displaced in time and space in relation to each other, so that the mass forces transferred from the linkage to the piston form together a force of constant or substantially constant value, the direction of which rotates with constant speed in a plane. Such a system is illustrated in Fig. 5. Upon a movement of the piston as mentioned above the members 34 and 35 will rock with approximate 90° of relative phase displacement in time and space in relation to each other. This will cause, that the mass forces transferred to the disc 20 through the connections of said disc with the members 32 and 33 consist, to a greater or smaller degree, of a force of approximately constant value and the direction of which varies as above described. This is of advantage, since such a rotative mass force may be balanced by means of another rotative mass force.

Figure 6:
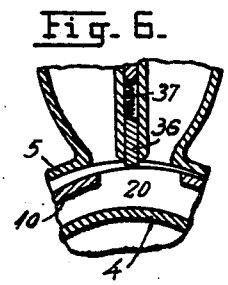

Figure 6 illustrates another embodiment of the invention. By means of a spring 37 a tightening member 36 is pressed against the disc 20 and serves to fill up that part of the opening in the partition 9 which is not, at every time, filled up by the disc 20. The tightening member 36 may be provided with a roller or other rotatable member at the end thereof facing the disc 20, in order to decrease the friction occurring by the relative movements of the tightening member and the disc.

Figure 7:
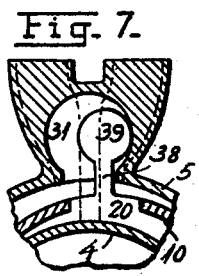

Figure 7 illustrates an embodiment of the invention, where the piston 10 has connected therewith, through the disc 20, a tongue, 38, extending through the opening 25 in the partition and further into an externally closed chamber 31 outside of the outer wall 5 of the working space. At its end the tongue 38 carries a cylindrical portion 39 which during operation of the machines tightens against the cylindrical inner wall of the chamber 31 for the greater part of the movement.

Figure 8:
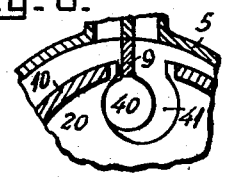

Figure 8 illustrates an embodiment of the invention, in which the partition 9 has no opening (25) therein, but where the partition is provided with a tongue 40. Said tongue 40 is, in the embodiment shown, of cylindrical shape and moves in a cylindrical recess or opening 41 in the disc 20. The interior wall of the working space is not shown in Fig. 8. The tongue 40 is at rest during the operation of the machine but in relation to the opening 41 it has a predetermined movement per revolution of the machine shaft.

Figure 9:
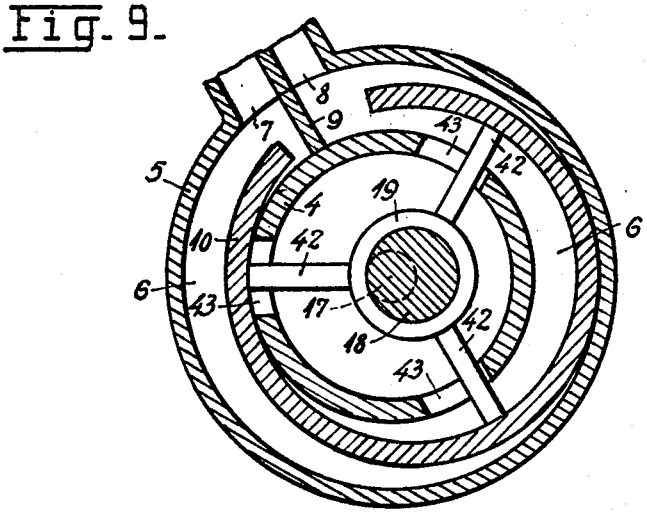
Figure 9 shows a section through a rotary machine of the same type as that of Figs. 1 and 2 but illustrating another embodiment of the force transfer organs.

The rotary machine of Fig. 9 is of the general design of that shown in Figs. 1 and 2, with the difference that the transfer of force between the piston 10 and the shaft 17 with eccentric 18 takes place by means of three spokes 42. Also here the piston 10 is assumed to move in such manner that all points thereof are moving on circles of like or substantially like radii. The means imparting such movement to the piston is not shown on the drawing. The spokes, which may be of circular cross section and may be attached to the piston mid-way between the ends of the latter, extend through openings 43 in the interior cylindrical wall 4 of the working space. The openings 43 must be so large that they admit of fully free movement of the spokes 42 during operation of the machine.

Figure 10:
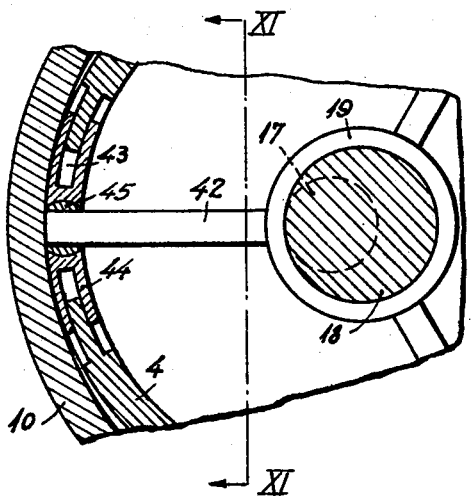
Fig. 10 illustrates, on a larger scale, tightening organs according to the invention for machines of the type disclosed in Fig. 9.
Figure 11:
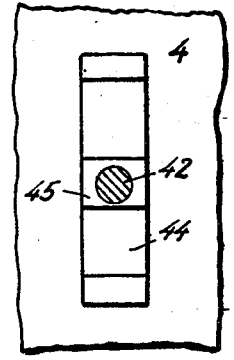
Fig. 11 shows a section taken along line XI—XI of Fig. 10.

Figures 10 and 11 illustrate, on a somewhat larger scale, tightening means for reducing or eliminating leakage through the openings 45 of Fig. 9. The tightening member 44 is so formed and arranged that it may slide both along the cylindrical wall 4 and along the spoke 42, and is adjacent to the spoke provided with a member 45 having cylinder surfaces enabling variation of the relative angular positions of the spoke and the tightening member occurring during the operation of the machine.

I claim:

1. A rotary machine comprising a closed casing with inlet and outlet openings, said casing having a working space limited by an outer and an inner curved wall, a piston adapted to operate in said casing between said curved walls and having a movement so that all points of the piston move in circles having the same diameter, a force transfer organ adapted to transfer forces to or from said piston to which said piston is connected rigidly, said transfer organ extending radially through one of said curved walls of said working space, one of said curved walls of said working space having an opening in which said transfer organ is freely movable, the dimension in the axial direction of said opening being similar to that of said force transfer organ, the dimension of said opening in the direction perpendicular to said first direction being at least so great that when said force transfer organ is in a position as far from one end of said opening as it can be during one revolution of the machine shaft, the distance between said force transfer organ and said end of the opening in the direction perpendicular to the axial direction will be at least equal to the diameter of said circles in which each point of the piston moves, movable sealing elements adapted to move in sealing engagement with the walls of said opening, means for moving said sealing elements, whereby leakage of the working medium from one side to the other side of said opening is reduced or prevented.

2. A rotary machine as set forth in claim 1 wherein said sealing elements comprise a linkage secured at one end to said casing and at the other end to said piston.

3. A rotary machine as set forth in claim 1 wherein said sealing elements comprise reciprocating members, means for giving said members said reciprocating movement, said members being in sealing engagement during their movement with the force transfer organ and said wall, thus preventing said leakage through said opening in said wall.

4. A rotary machine as set forth in claim 1, wherein a chamber is provided in a wall of said casing, the sealing elements comprising a tongue rigidly connected to said piston and being adapted to move in said chamber in sealing engagement with the wall of said chamber.

5. A rotary machine as set forth in claim 1, wherein a partition is provided separating the high pressure side of the machine from the low pressure side thereof, a chamber in said partition, and a tongue rigidly connected to said piston and adapted to move in said chamber in sealing engagement with the walls thereof.

6. A rotary machine as set forth in claim 1, wherein said inner wall of said working space is provided with a plurality of openings, a force transfer organ being movable freely in each of said openings, sealing elements in each opening slidable in circumferential directions of said inner wall, said force transfer organ being radially slidable in relation to said sealing elements, said sealing elements being in sealing engagement with the side walls of said openings in said inner wall and said force transfer organs respectively.

References Cited in the file of this patent

UNITED STATES PATENTS

| Number | Name | Date |
|---|---|---|
| 104,403 | Allyn | June 21, 1870 |
| 196,732 | Winkler | Oct. 30, 1877 |
| 385,832 | Allyn | July 10, 1888 |
| 1,079,561 | Kinney | Nov. 25, 1913 |
| 1,266,298 | Metcalf | May 14, 1918 |
| 1,378,065 | Varley | May 17, 1921 |
| 1,502,470 | Hart | July 22, 1924 |
| 1,959,904 | Cornell | May 22, 1934 |
| 2,076,723 | Heinze | Apr. 13, 1937 |
| 2,236,660 | White | Apr. 1, 1941 |
| 2,493,148 | Kiekhaefer | Jan. 3, 1950 |
| 2,536,005 | Knuth | Dec. 26, 1950 |
| 2,538,598 | Straatveit | Jan. 16, 1951 |